United States Patent [19]

Hayashi

[11] 4,219,285
[45] Aug. 26, 1980

[54] CLAMP-CONNECTOR FOR JOINING THREE TUBULAR MEMBERS

[76] Inventor: Henry T. Hayashi, 2373 Abreu Rd., Union City, Calif. 94587

[21] Appl. No.: 969,307

[22] Filed: Dec. 14, 1978

Related U.S. Application Data

[63] Continuation-in-part of Ser. No. 808,044, Jun. 20, 1977, Pat. No. 4,136,984.

[51] Int. Cl.² .............................................. F16B 9/02
[52] U.S. Cl. .................................... 403/188; 403/217; 403/231
[58] Field of Search .............. 403/170, 175, 188, 217, 403/218, 219, 231, 400, 403; 285/150; 248/68 R

[56] References Cited

U.S. PATENT DOCUMENTS

| 885,240 | 4/1908 | Graham | 285/150 |
|---|---|---|---|
| 885,992 | 4/1908 | Graham | 285/150 |
| 1,150,781 | 8/1915 | Louden | 403/218 |
| 2,658,776 | 11/1953 | Wilcox | 403/170 X |
| 2,696,396 | 12/1954 | Pittaluga | 403/171 |
| 2,711,917 | 6/1955 | Blu | 403/171 |
| 3,062,570 | 11/1962 | Schwartz | 403/172 |
| 3,226,069 | 12/1965 | Clarke | 248/68 R X |
| 3,944,175 | 3/1976 | Kearney | 248/68 R X |

FOREIGN PATENT DOCUMENTS

| 212185 | 1/1958 | Australia | 403/217 |
|---|---|---|---|
| 1037541 | 4/1953 | France | 403/175 |
| 60228 | 4/1954 | France | 403/217 |
| 600163 | 11/1959 | Italy | 403/175 |

OTHER PUBLICATIONS

*The Kee Klamp*, Bulletin KK474, Kee Klamp Division, Gascolgne Industrial Products, Ltd., Buffalo, New York.

Stepler, R. *Tube/Clamp System*, Popular Science, pp. 100, 101, Jun. 1977.

*Primary Examiner*—Robert Mackey
*Attorney, Agent, or Firm*—James R. Cypher

[57] ABSTRACT

A clamp-connector for joining three tubular members in which one tubular member is positioned to intersect the other two members and the other two members are positioned to intersect only one other member. The tubular members need not be threaded, welded, drilled or bolted. The clamp connector consists briefly of a sheet metal bracket formed with quarter-round portions for cradling the tubular members and openings for receiving the clamps. The clamps are standard worm gear clamps with perforated straps.

2 Claims, 2 Drawing Figures

CLAMP-CONNECTOR FOR JOINING THREE TUBULAR MEMBERS

BACKGROUND OF THE INVENTION

This application is a continuation-in-part of my application Ser. No. 808,044 filed June 20, 1977; now U.S. Pat. No. 4,136,984 granted Jan. 30, 1979.

Metal and plastic tubing has come into wide spread usage in constructing racks, stands, railings, benches, tables, shelves, scaffolds, etc. for industrial, commercial and home do-it-yourself projects. Many different connectors have been devised to connect the tubing. Graham, U.S. Pat. No. 885,240, Apr. 21, 1908 and U.S. Pat. No. 885,992, Apr. 28, 1908 provided a cast bracket which connected pipe by inserting bolts through holes drilled in the pipe.

Pittaluga, U.S. Pat. No. 2,696,396, Dec. 7, 1954 and Blu, U.S. Pat. No. 2,711,917, June 28, 1955 provided connectors which in effect were clamps for joining pipes. The connectors would only take one size pipe. Schwartz, U.S. Pat. No. 3,062,570, Nov. 6, 1962, formed his connector from a sheet metal member but there was no positive connection between the connector and the tubular member. The pipe was held to the connector merely by the friction in the pre-bent cut-out strap-like portions.

SUMMARY OF THE INVENTION

The gist of the present invention is the construction of a novel bracket from sheet metal which in combination with a standard worm gear clamp can be used to construct a wide variety of structures from tubular members or rods.

The present clamp-connector provides an inexpensive means for joining tubular members in the construction of racks, stands, railings, benches, tables, shelves, scaffolds, bracing and many other structures.

The clamp-connector needs only a screw drive to make all the connections and thus it can be used by do-it-yourselfers as well as industrial and commercial applications.

When stainless steel, worm gear clamps are used, the finished project is rigid, of high load capacity, deterioration proof and neat in appearance.

The use of a worm gear clamp rather than a single screw fastener provides increased rigidity and strength.

The clamp-connector system is less expensive since there are no metal castings, no drilling of pipes or pipe threading requirements.

The clamp-connectors may be replaced without unfastening other parts of the structure.

Each clamp or each bracket can be used with several different diameter tubular members.

DESCRIPTION OF THE PREFERRED EMBODIMENT

Figure 1:
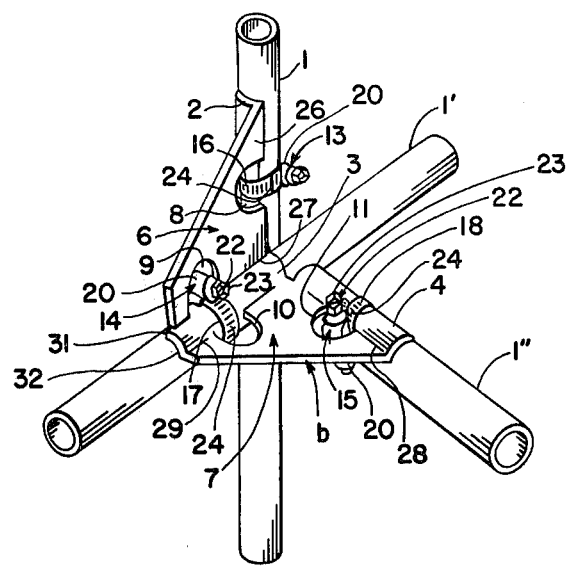
FIG. 1 is a perspective view of the clamp-connector of the present invention.
Figure 2:
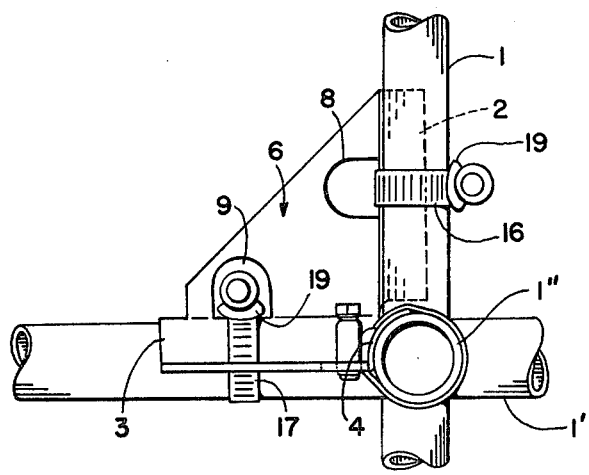
FIG. 2 is a side view of the clamp-connector of FIG. 1.

This application discloses a clamp-connector for joining circular tubular members 1. The clamp-connectors includes a structural metal bracket b, forming three angularly related curved portions 2, 3 and 4 and joined by web portions 6 and 7. The curved portions are adapted for cradling portions of the structural tubular members. At least one clamp opening is formed through the web portion at the intersection of each of the curved portions and the web portions. In the connector illustrated, the openings are semi-circular cutouts indicated by the numbers 8, 9, 10 and 11.

The bracket has three clamp means 13, 14 and 15 including straps 16, 17 and 18 inserted through the openings and adapted for encircling each of the curved portions and the structural tubular members cradled therein.

The curved portion could nearly encircle the structural tubular member, but preferably, the curved portion is limited to an approximately 90° arc. With the curve portion thus limited, the bracket may accommodate structural tubular members having a range of different diameters. If the curved portion encircles the structural tubular member almost entirely, then the sizes of structural tubular members which could be accomodated would be severely limited.

The clamp means may be standard worm gear clamps made by Wittek Mfg. Co. One of the common uses for this type of clamp is to hold water hoses on automobile heaters and radiators. The clamp means have a worm gear 19 journaled for rotation on a housing 20. The end of the worm gear shanks may be formed with hexagonal heads 22 so that a wrench may be used to turn the worm gear. They also may be formed with slots 23 so that a screw driver can turn the worm gear. The worm gear is mounted so that it engages the slits 24 in the straps 16, 17 and 18. As the worm gear is turned, the strap is wound more tightly about the bracket and structural tubular member.

The clamp-connector includes a bracket b which is formed with a first web 6 and a second web 7 positioned at right angles to one another; joined by a first curved portion 3. The first web 6 is formed with a first edge 26 at right angles to the first curved portion 3 and a first inner edge 27 joining the second curved portion 3. The bracket is formed with a second curved portion 2 adjoining the first edge 26. The second web 7 is formed with a second edge 28 at right angles to the first curved portion 3 and at right angles to the second curved portion 2 and a second inner edge 29 adjoining the first curved portion 3. The bracket is also formed with a third curved portion 4 adjoining the second edge 28. The curved portions are positioned with respect to the web portions so that the tubular members 1 and 1" are craddled in the second and third curved portions and intersect one another. Also, the tubular member 1' cradled in the first curved portion 3 does not intersect tube 1 cradled in the second curved portion 2. To illustrate the fact that different size tubular members may be used, tube 1" is larger than tube members 1 and 1' even though the radius of curvature of curved portion 4 is the same as the radius for curved portions 2 and 3.

The first triangular web member 6 is formed with a first opening 8 adjoining the first edge 26. Clamp strap 16 is inserted therethrough. The opening is preferably large enough to receive clamp housing 20. A second opening 9 is formed in web 6 and adjoins inner edge 27.

Second web 7 is formed with a third opening 11 adjoining the second edge 28 and a fourth opening 10 adjoining second inner edge 29. Openings 9 and 10 receive strap 17 and opening 11 receives strap 18. The openings may be large enough to receive the clamp housings therethrough.

The first circular quarter-arc elongated curved portion 3 includes a straight first outer edge 31 connected to the first inner edge 27 of the first web 6 and a second outer edge 32 joined to the second inner edge 29 of the second web 7.

A typical use of the system is to form a shelving system. Bracket b is attached to structural tubular post member 1 by strap 16 of clamp 13. Horizontal structural beam member tubes 1' and 1" are connected to the bracket by bands 17 and 18 and clamps 14 and 15. A shelf may be held by the horizontal structural tubes which can hold articles. A second shelf may be supported by clamping another bracket to vertical structural tubular post member 1 above the first bracket.

The clamp connector may also be used as a jig in welding pipe. The clamp when used as a pipe jig could be made at any angle required for the welding operation.

The clamp connector when constructed with sufficient strength may be used in providing the framing for building structures; particularly temporary structures which are enclosed in plastic or fabric sheeting.

I claim:

1. A structural clamp-connector comprising:
   a. three structural circular elongated tubular members (1), (1'), (1");
   b. a bracket member including:
      1. a first triangular web member (6) formed with a straight first inner edge (27) a straight first edge (26) positioned at right angles to one another and also formed with a first opening (8) adjoining said straight first edge (26) and a second opening (9) adjoining said straight first inner edge (27),
      2. a second triangular web member (7) formed with a straight second inner edge (29) and a straight second edge (28) positioned at right angles to one another and also formed with a third opening (11) adjoining said straight second edge (28) and a fourth opening (10) adjoining said straight second inner edge (29),
      3. a first circular elongated curved arc portion (3) for receiving one of said tubular members (1') having a first straight outer edge (31) connected to straight first inner edge (27) of said first web member (6) and also having a second outer edge (32) joined to said straight second inner edge (29) of said second web member (7) so that said first and second webs are connected at right angles to one another.
      4. a second circular elongated curved arc portion (2) for receiving another of said straight tubular member (1) and connected along an edge to said first edge (26) of said first web members member (6) and positioned at right angles to said first curved portion (3),
      5. a third elongated curved arc portion (4) for receiving still another of said straight tubular members (1") and connected along an edge to said second edge (28) of said second web member (7) and positioned at right angles to said first and second curved portions (3), (2),
      6. said first curved portion (3) is positioned so that structural tubular member (1') intersects structural member (1") only, second curved portion (2) is positioned so that structural tubular member (1) intersects structural tubular member (1") only and third curved portion (4) is positioned so that structural tubular member (1") intersects both structural tubular members (1) and (1'),
   c. a plurality of clamp members (13), each including:
      1. a strap member (16) formed with a plurality of slits (24) and inserted through said openings (8-11) and encircling said curved portions (2-4) said tubular members (1), (1'), (1") cradled therein,
      2. a housing (20) formed with a U-shaped member for receiving and holding said strap (16),
      3. a worm gear (19) journaled for rotation within said housing (20) for engaging said slits (24) in said strap (16) and also formed with a tool engaging head for manual rotation of said worm gear;
   d. said clamp members are selected so that a hand tool is capable of pulling said straps (16) in such close fitting frictional engagement around said tubular members (1), (1'), (1") and said curved portions (2), (3), (4) that said structural tubular members cannot move with respect to said bracket member.

2. A structural clamp-connector as described in claim 1 wherein
   a. said first, second, third and fourth openings are dimensioned to receive said clamp housings and straps therethrough.

* * * * *